Patented Sept. 7, 1943

2,328,960

UNITED STATES PATENT OFFICE 2,328,960

DIAZINE DERIVATIVES

Gaetano F. D'Alelio and James W. Underwood, Pittsfield, Mass., assignors to General Electric Company, a corporation of New York No Drawing. Application August 27, 1942, Serial No. 456,412

19 Claims. (Cl. 260—251)

This invention relates to new chemical compounds and more particularly to diazine derivatives. The invention especially is concerned with the production of new and useful esters of bis-(diazinyl thio) monocarboxylic aliphatic acids.

The chemical compounds of this invention may be represented by the following general formula:

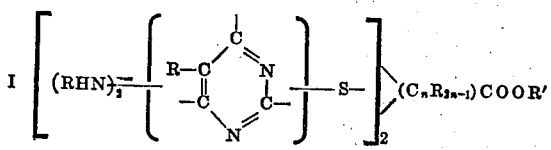

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically nuclearly halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. However, there also may be produced in accordance with the present invention compounds such, for instance, as those represented by the general formula:

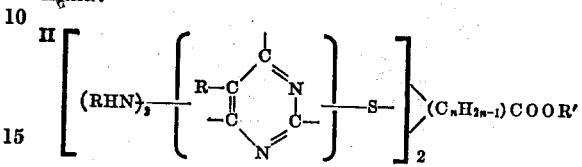

where $n$, R and R' have the same meanings as given above with reference to Formula I.

The new compounds of this invention may be used, for example, as pharmaceuticals, plasticizers, fungicides, insecticides and as intermediates in the preparation of derivatives thereof, e. g., hydrazino, carbazido, semicarbazido, ureido, amidine, methylol, methylene, etc., derivatives of the individual compound embraced by Formula I. Our new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 461,771, filed October 12, 1942, as a continuation-in-part of the present application and assigned to the same assignee as the present invention. These new diazine derivatives also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between (1) a mercapto diazine corresponding to the general formula

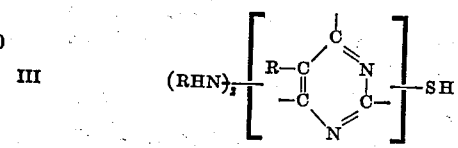

and (2) an ester of a dihalogenated aliphatic monocarboxylic acid corresponding to the general formula IV         $X_2C_nR_{2n-1}COOR'$ where X represents a halogen atom and $n$, R and R' have the same meanings as given above with reference to Formula I, the reactants being employed in the ratio of at least two mols of the mercapto diazine of (1) per mol of the ester of (2).

Illustrative examples of mercapto diazines, more particularly mercapto pyrimidines, that may be used, depending upon the particular end-product desired, are:

2-mercapto 4,6-diamino pyrimidine
4-mercapto 2,6-diamino pyrimidine (6-mercapto 2,4-diamino pyrimidine)
2-mercapto 4,6-diamino 5-methyl pyrimidine
4-mercapto 2,6-diamino 5-ethyl pyrimidine
2-mercapto 4,6-diamino 5-phenyl pyrimidine
2-mercapto 4-bromotoluido 6-benzylamino pyrimidine
2-toluido 4-mercapto 6-methylamino pyrimidine
2-mercapto 4-phenylchloroethylamino 6-phenethylamino pyrimidine
2-mercapto 4-chloroanilino 6-ethylphenylamino pyrimidine
2 - mercapto - 4 - cycloheptylamino 6 - isopropylamino pyrimidine
2-mercapto 4,6-di-(methylamino) pyrimidine
2-mercapto 4,6-di-(ethylamino) 5-fluorophenyl pyrimidine
2-mercapto 4,6-di-(fluoroanilino) pyrimidine
2-mercapto 4-methylamino 6-amino pyrimidine
2-mercapto 4-propenylamino 6-amino pyrimidine
2-mercapto 4,6-di-(benzylamino) 5-methyl pyrimidine
2-mercapto 4,6-di-(cyclopentylamino) 5 - ethyl pyrimidine
2-mercapto 4,6-dianilino pyrimidine
2-mercapto 4,6-ditoluido 5-iodophenyl pyrimidine
2-mercapto 4,6-dixylidino pyrimidine
2-mercapto 4,6-di-(phenethylamino) 5-butyl pyrimidine
2-mercapto 4,6-di-(ethylphenylamino) 5-tolyl pyrimidine
4-mercapto 2,6-di-(methylamino) 5-methyl pyrimidine
2-mercapto 4,6-di-(chloroethylamino) pyrimidine
2-mercapto 4,6-di-(bromoxylidino) 5-chloroethyl pyrimidine
2-mercapto 4,6-diamino 5-bromotolyl pyrimidine
2-mercapto 4,6-di-(iodoanilino) pyrimidine
2-mercapto 4-allylamino 6-butylamino pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-dianilino 5-butyl pyrimidine
2-mercapto 4 - xenylamino 5 - cyclohexenyl 6 - amino pyrimidine
2-mercapto 4-xenylamino 5-cyclopentyl 6-amino pyrimidine
2-toluido 4-mercapto 5-cyclohexenyl 6-amino pyrimidine
2-mercapto 4,6-di-(propylamino) pyrimidine
2-allylamino 4-mercapto 6-chloroanilino pyrimidine
2-pentylamino 4-mercapto 5-phenyl 6-amino pyrimidine
2-dichloroanilino 4-mercapto 5 - tolyl 6 - propylamino pyrimidine
2- cycloheptylamino 4 - mercapto 6 - butylamino pyrimidine
2 - mercapto 4-(3' - butenylamino) 6 - isopropylamino pyrimidine
2-mercapto 4-amino 5-phenylpropyl 6-chlorocyclohexylamino pyrimidine
2- mercapto 4 - amino 6 - chlorocyclohexylamino pyrimidine
2-mercapto 4,6-diamino 5-bromotolyl pyrimidine Illustrative examples of esters of dihalogeno aliphatic monocarboxylic acids that may be used, depending upon the particular end-product desired, are:

The aliphatic and aromatic dihalogenoacetates and dihalogenopropionates
The nuclearly halogenated aromatic dihalogenoacetates and dihalogenopropionates More specific examples are:

Methyl dichloroacetate
Methyl dibromoacetate
Ethyl dichloroacetate
Ethyl dibromoacetate
Methyl diiodoacetate
Ethyl diiodoacetate
Propyl dichloroacetate
Propyl dibromoacetate
Isobutyl dichloroacetate
Propenyl dichloroacetate
Cyclopentyl dichloroacetate
Phenyl dichloroacetate
Benzyl dichloroacetate
Ethylphenyl dichloroacetate
Methyl alpha,beta-dichloropropionate
Ethyl alpha,beta-dichloropropionate
Propyl alpha,beta-dichloropropionate
Allyl alpha,beta-dichloropropionate
Phenyl alpha,beta-dibromopropionate
Methyl alpha,alpha-dichloropropionate
Phenyl alpha,alpha-dibromopropionate
Methyl beta,beta-dichloropropionate
Ethyl beta,beta-diiodopropionate
Tolyl beta,beta-dichloropropionate
Methyl alpha-methyl alpha,beta - dichloropropionate
Phenyl alpha-ethyl beta,beta-dichloropropionate
Methyl beta - phenyl alpha,alpha - dichloropropionate
Benzyl alpha,beta-dichloropropionate
Fluorophenyl dichloroacetate
Iodotolyl dibromoacetate
Chlorophenyl dichloroacetate
Bromotolyl dichloroacetate
Hexyl alpha,beta-dichloropropionate
Pentyl alpha,alpha-dichloropropionate
Xenyl beta,beta-dibromopropionate
Methyl alpha-chlorophenyl alpha,beta-dichloropropionate
Phenyl alpha - chlorotolyl alpha,beta - dichloropropionate Various hydrohalide acceptors may be employed. We prefer to use a hydrohalide acceptor that will react with the mercapto diazine to form a water-soluble salt. Examples of such acceptors are the alkali-methal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino [(—NHR)$_2$] diazine and the chosen ester of a dihalogeno aliphatic monocarboxylic acid may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. Instead of alcohol, other solvents may be employed, for instance dioxane. The reaction may be carried out under a variety of temperature and pressure conditions, for example at normal, sub-normal or at elevated temperatures and at atmospheric, subatmospheric or super-atmospheric pressures. From the standpoint of convenience and economy, normal or elevated temperature conditions and atmospheric pressure usually are most desirable.

The above reaction may be represented by the following general equation:

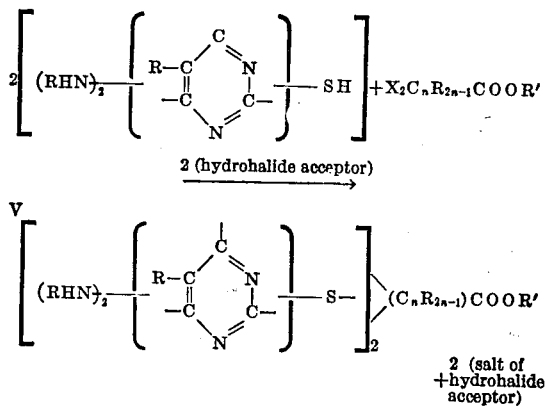

In the above equation X represents a halogen taom, and $n$, R and R' have the same meanings as given above with reference to Formula I.

In order that those skilled in the art better may understand how the present invention may be carried into effect, the following examples are given by way of illustration and not by way of limitation. All parts are by weight.

*Example 1*

This example illustrates the preparation of methyl alpha,beta-bis-(4,6-diamino pyrimidyl-2 thio) propionate.

|  | Parts | Approximate mol ratio |
|---|---|---|
| 2-mercapto 4,6-diamino pyrimidine | 142.0 | 2 |
| Methyl alpha,beta-dichloropropionate | 78.5 | 1 |
| Sodium hydroxide | 40.0 | 2 |
| Water | 500.0 | |
| Alcohol | 500.0 | |

All of the above ingredients with the exception of the methyl alpha,beta-dichloropropionate were mixed together, yielding a clear solution. The ester was then added and the mass was allowed to stand at room temperature for 5 days, followed by heating under reflux at the boiling temperature of the mass for 1 hour. After cooling, the precipitated product comprising methyl alpha,beta-bis-(4,6-diamino pyrimidyl - 2 thio) propionate was filtered off, washed well with water to remove soluble salts and dried. No attempt was made to obtain any more product from the mother liquor. A yield of 150 parts of the purified, dried compound was obtained.

*Example 2*

Methyl alpha,beta-bis-(2,6-diamino pyrimidyl-4 thio) propionate [methyl alpha,beta-bis-(2,4-diamino pyrimidyl-6 thio) propionate] is prepared in essentially the same manner as described under Example 1 with the exception that 142 parts of 4-mercapto 2,6-diamino pyrimidine are used in place of 142 parts of 2-mercapto 4,6-diamino pyrimidine.

*Example 3*

Ethyl bis-(4,6-diamino pyrimidyl-2 thio) acetate is prepared in essentially the same manner as described under Example 1 with the exception that 78.5 parts of ethyl dichloroacetate are used in place of 78.5 parts of methyl alpha,beta-dichloropropionate.

*Example 4*

Ethyl bis-(2,6-diamino pyrimidyl-4 thio) acetate is prepared in essentially the same manner as described under Example 1 with the exception that 78.5 parts of ethyl dichloroacetate are used in place of 78.5 parts of methyl alpha,beta-dichloropropionate and 142 parts of 4-mercapto 2,6-diamino pyrimidine are used instead of 142 parts of 2-mercapto 4,6-diamino pyrimidine.

*Example 5*

Propyl alpha,beta-bis-(4,6-diamino pyrimidyl-2 thio) butyrate is prepared in essentially the same manner as described under Example 1 with the exception that 144 parts of propyl alpha,beta-dibromobutyrate are used instead of 78.5 parts of methyl alpha,beta-dichloropropionate.

*Example 6*

Methyl alpha,beta-bis-[4,6-(methylamino) pyrimidyl-2 thio] propionate is prepared in essentially the same manner as described under Example 1 with the exception that 170 parts of 2-mercapto 4,6-di-(methylamino) pyrimidine are used in place of 142 parts of 2-mercapto 4,6-diamino pyrimidine.

*Example 7*

Phenyl bis-(4,6-diamino pyrimidyl-2 thio) acetate is prepared in essentially the same manner as described under Example 1 with the exception that 102.5 parts of phenyl dichloroacetate are used in place of 78.5 parts of methyl alpha,beta-dichloropropionate.

*Example 8*

Phenyl bis-(2,6-diamino pyrimidyl-4 thio) acetate is prepared in essentially the same manner as described under Example 1 with the exception that 102.5 parts of phenyl dichloroacetate are used in place of 78.5 parts of methyl alpha,beta-dichloropropionate and 142 parts of 4-mercapto 2,6-diamino pyrimidine are used instead of 142 parts of 2-mercapto 4,6-diamino pyrimidine.

Illustrative examples of other compounds embraced by Formula I that may be produced in accordance with the present invention are listed below, including examples of aliphatic (e. g., alkyl, alkenyl), aromatic and nuclearly halogenated aromatic esters of bis-(pyrimidyl thio) acetic and propionic acids:

Ethyl bis-[4,6-di-(methylamino) pyrimidyl-2 thio] acetate
Isobutyl bis-(4,6-diamino pyrimidyl-2 thio) acetate
Propenyl bis-(4,6-diamino pyrimidyl-2 thio) acetate
Phenyl bis-[4,6-di-(ethylamino) pyrimidyl-2 thio] acetate
Benzyl bis-[4,6-di-(isobutylamino) pyrimidyl-2 thio] acetate
Tolyl bis-(4,6-diamino pyrimidyl-2 thio) acetate
Ethyl alpha,beta-bis-(4,6-diamino pyrimidyl-2 thio) propionate
Phenyl beta,beta-bis-(4,6-diamino pyrimidyl-2 thio) propionate
Methyl bis-[4,6-di-(methylamino) pyrimidyl-2 thio] acetate
Methyl bis-[4,6-di-(ethylamino) pyrimidyl-2 thio] acetate
Methyl bis-(4,6-diamino 5-methyl pyrimidyl-2 thio) acetate
Ethyl bis-[4,6-di-(ethylamino) pyrimidyl-2 thio] acetate
Phenyl bis-[4,6-di-(isobutylamino) pyrimidyl-2 thio] acetate
Fluorophenyl bis-[4,6-di-(cyclopentylamino) pyrimidyl-2 thio] propionates
Ethyl alpha-ethyl alpha,beta-bis-(4,6-ditoluido pyrimidyl-2 thio) propionate
Tolyl bis-[4,6-di-(propenylamino) pyrimidyl-2 thio] acetate
Phenyl alpha-phenyl beta,beta-bis-(4,6-diamino 5-methyl pyrimidyl-2 thio) propionate
Tolyl beta-propyl alpha,beta-bis-(2,6-diamino 5-ethyl pyrimidyl-4 thio) propionate
Methyl alpha,beta-bis-(4,6-diamino 5-xenyl pyrimidyl-2 thio) propionate
Methyl alpha,beta-bis-(2,6-diamino 5-methyl pyrimidyl-4 thio) propionate
Ethyl alpha,beta-bis-(4-methylamino 6-amino pyrimidyl-2 thio) propionate
Methyl bis-[4,6-di-(iodoanilino) pyrimidyl-2 thio] acetate
Methyl bis-[2,6-di-(chloroethylamino) pyrimidyl-4 thio] acetate
Methyl bis-[4,6-di-(ethylamino) 5-ethyl pyrimidyl-2 thio] acetate
Ethyl bis-(4,6-dianilino 5-isobutyl pyrimidyl-2 thio) acetate
Phenyl alpha,beta-bis-(4-methylamino 5-propenyl 6-ethylamino pyrimidyl-2 thio) propionate
Tolyl alpha,beta-bis-(4,6-dianilino 5-phenyl pyrimidyl-2 thio) propionate
Methyl bis-(4,6-diamino 5-cyclopentyl pyrimidyl-2 thio) acetate
Methyl bis-(2,6-diamino 5-methyl pyrimidyl-4 thio) acetate
Methyl alpha,beta-dimethyl alpha,beta-bis-(4,6-diamino pyrimidyl-2 thio) propionate, which also may be named methyl alpha-methyl alpha,beta-bis-(4,6-diamino pyrimidyl-2 thio) butyrate
Ethylphenyl bis-(4,6-diamino pyrimidyl-2 thio) acetate
Allyl bis-(4,6-diamino pyrimidyl-2 thio) acetate
Allyl alpha,beta-bis-(4,6-diamino pyrimidyl-2 thio) propionate
Methallyl beta,beta-bis-(4,6-diamino pyrimidyl-2 thio) propionate
Cyclohexyl bis-(2,6-diamino pyrimidyl-4 thio) acetate
Phenylethyl bis-(2,6-diamino pyrimidyl-4 thio) acetate
Phenylpropyl alpha,beta-bis-(4,6-diamino pyrimidyl-2 thio) propionate
Chlorophenyl bis-(4,6-diamino pyrimidyl-2 thio) acetate
Dichlorophenyl alpha,beta-bis-(2,6-diamino pyrimidyl-4 thio) propionate
Iodotolyl beta,beta-bis-(4,6-diamino pyrimidyl-2 thio) propionate
Tetradecyl bis-(4,6-diamino pyrimidyl-2 thio) acetate
Octyl alpha,beta-bis-(4,6-diamino pyrimidyl-2 thio) propionate
Pentyl bis-(2,6-diamino pyrimidyl-4 thio) acetate
Naphthyl alpha,beta-bis-(4,6-diamino 5-chlorophenyl pyrimidyl-2 thio) propionate
Xenyl bis-[4,6-di-(dichloroanilino) 5-propyl pyrimidyl-2 thio] acetate
Ethyl alpha,beta-bis-[4,6-di-(cyclohexenylamino) 5-butyl pyrimidyl-2 thio] propionate
Hexyl bis-[4,6-di-(bromopropylamino) 5-naphthyl pyrimidyl-2 thio] acetate
Bromophenyl alpha,beta-bis-(2,6-dianilino pyrimidyl-4 thio) acetate
Propyl alpha,beta-bis-[2,6-di-(allylamino) 5-allyl pyrimidyl-4 thio] propionate
Crotyl bis-(4,6-diamino pyrimidyl-2 thio) acetate
Butenyl bis-(2,6-diamino 5-methyl pyrimidyl-4 thio) acetate
Chlorotolyl bis-(4,6-diamino 5-xenyl pyrimidyl-2 thio) acetate In a manner similar to that described above with particular reference to the esters of bis-(pyrimidyl thio) monocarboxylic acids, corresponding derivatives of the 1,2- or ortho-diazines (pyridazines) and of the 1,4- or para-diazines (pyrazines) may be prepared.

What we claim as new and desire to secure by Letters Patent of the United States is:

1. Chemical compounds corresponding to the general formula

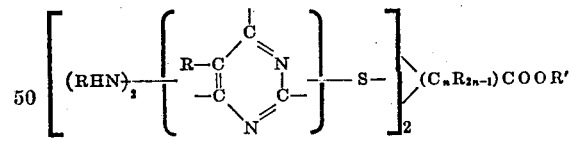

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. Chemical compounds corresponding to the general formula

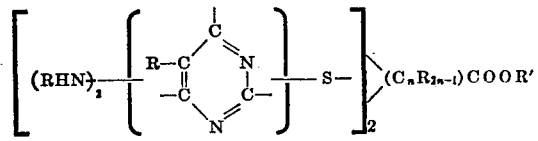

where $n$ represents an integer and is at least 1 and not more than 2, R represents hydrogen, and R' represents a member of the class consisting of monovalent aliphatic hydrocarbon radicals and monovalent aromatic and nuclearly halogenated aromatic hydrocarbon radicals.

3. Chemical compounds corresponding to the general formula

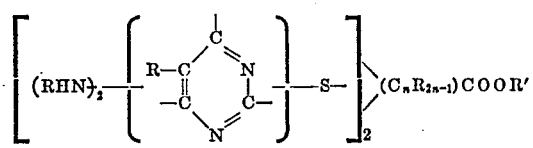

where $n$ represents an integer and is at least 1 and not more than 2, R represents hydrogen, and R' represents a monovalent aliphatic hydrocarbon radical.

4. Chemical compounds corresponding to the general formula

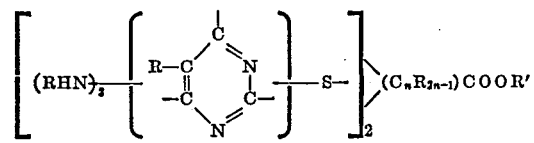

where $n$ represents an integer and is at least 1 and not more than 2, R represents hydrogen, and R' represents a monovalent aromatic hydrocarbon radical.

5. Chemical compounds corresponding to the general formula

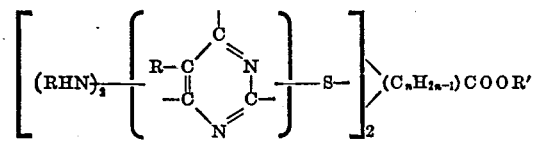

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

6. An aliphatic ester of a bis-(diamino pyrimidyl thio) acetic acid.

7. An alkyl ester of a bis-(diamino pyrimidyl thio) acetic acid.

8. An aliphatic ester of a bis-(diamino pyrimidyl thio) propionic acid.

9. An alkyl ester of a bis-(diamino pyrimidyl thio) propionic acid.

10. An aromatic ester of a bis-(diamino pyrimidyl thio) acetic acid.

11. A phenyl bis-(diamino pyrimidyl thio) acetate.

12. Phenyl bis-(4,6-diamino pyrimidyl-2 thio) acetate.

13. An ethyl bis-(diamino pyrimidyl thio) acetate.

14. Ethyl bis-(4,6-diamino pyrimidyl-2 thio) acetate.

15. A methyl alpha,beta-bis-(diamino pyrimidyl thio) propionate.

16. Methyl alpha,beta-bis - (4,6 - diamino pyrimidyl-2 thio) propionate.

17. The method of preparing chemical compounds corresponding to the general formula

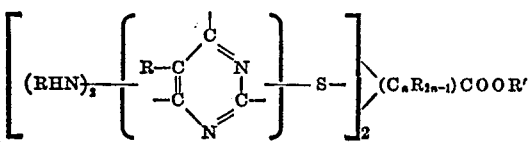

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of a hydrohalide acceptor, between (1) a mercapto diazine corresponding to the general formula

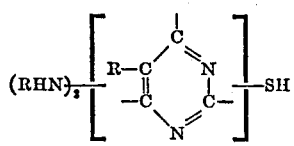

where R has the meaning above given, and (2) an ester of a dihalogenated monocarboxylic aliphatic acid corresponding to the general formula $$X_2C_nR_{2n-1}COOR'$$

where X represents a halogen atom, and $n$, R and R' have the same meanings as given above, the said reactants being employed in the ratio of at least two mols of the mercapto diazine of (1) per mol of the ester of (2).

18. The method of preparing chemical compounds corresponding to the general formula

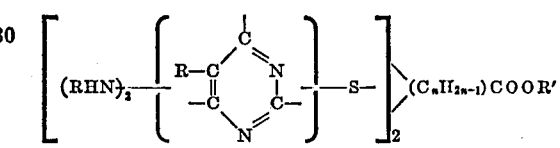

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of an alkali-metal hydroxide, between (1) a mercapto diazine corresponding to the general formula

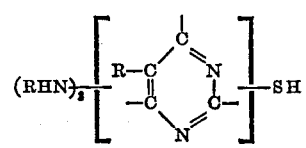

where R has the meaning above given, and (2) an ester of a dihalogenated monocarboxylic aliphatic acid corresponding to the general formula $$X_2C_nH_{2n-1}COOR'$$

where X represents a chlorine atom, and $n$ and R' have the same meanings as given above, the said reactants being employed in the ratio of at least two mols of the mercapto diazine of (1) per mol of the ester of (2).

19. The method of preparing a methyl alpha, beta-bis-(diamino pyrimidyl thio) propionate which comprises effecting reaction, in the presence of an alkali-metal hydroxide, between methyl alpha,beta-dichloropropionate and a mercapto diamino pyrimidine in the ratio of one mol of the former to at least two mols of the latter.

GAETANO F. D'ALELIO.
JAMES W. UNDERWOOD.

Certificate of Correction

Patent No. 2,328,960.                                                  September 7, 1943.

GAETANO F. D'ALELIO, ET AL.

It is hereby certified that errors appear in the printed specification of the above numbered patent requiring correction as follows: Page 2, second column, line 72, for "methal" read *metal*; page 3, first column, line 31–36, for that portion of the formula reading

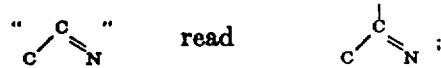

line 49, for "taom" read *atom*; and second column, line 48, for "4,6-(methylamino)" read *4,6-di-(methylamino)*; and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*